United States Patent
Honda et al.

(10) Patent No.: US 6,954,350 B2
(45) Date of Patent: Oct. 11, 2005

(54) CERAMIC LAYERED PRODUCT AND METHOD FOR MANUFACTURING THE SAME

(75) Inventors: Kazuyoshi Honda, Takatsuki (JP); Yoriko Takai, Toyonaka (JP); Atsuo Nagai, Hirakata (JP); Masako Murao, Sakai (JP); Keiji Kobayashi, Kawachinagano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/663,629

(22) Filed: Sep. 16, 2003

(65) Prior Publication Data

US 2004/0071946 A1 Apr. 15, 2004

(30) Foreign Application Priority Data

Oct. 15, 2002 (JP) ........................................ 2002-301027

(51) Int. Cl.$^7$ ........................... H01G 4/06; C23C 16/00; C23C 14/00
(52) U.S. Cl. ................. 361/321.4; 361/307; 361/321.2; 427/250; 427/255.29; 427/255.31; 204/192.1
(58) Field of Search ............................. 361/307, 321.2, 361/321.4, 301.1, 301.4, 306.3, 321.1, 321.3, 321.5; 427/250, 255.29; 428/255.31; 204/192.1

(56) References Cited

U.S. PATENT DOCUMENTS 3,909,327 A * 9/1975 Pechini .................... 156/89.14
5,021,921 A * 6/1991 Sano et al. ................ 361/321.3
5,378,548 A * 1/1995 Torii et al. ............. 428/694 TS
5,835,339 A  11/1998 Sakamoto et al.
6,356,430 B1 * 3/2002 Yoshida et al. ............. 361/305
6,606,238 B1 * 8/2003 Nakamura et al. ....... 361/321.2
6,627,120 B2 * 9/2003 Shimizu .................. 252/521.2

FOREIGN PATENT DOCUMENTS

| JP | 6-96988 | 4/1994 |
|---|---|---|
| JP | 6-232000 | 8/1994 |
| JP | 2000-178601 | 6/2000 |
| JP | 3097007 | 8/2000 |
| JP | 2001-122660 | 5/2001 |

* cited by examiner

Primary Examiner—Cathy F. Lam
(74) Attorney, Agent, or Firm—Hamre, Schumann, Mueller & Larson, P.C.

(57) ABSTRACT

A ceramic layered product 10 includes a plurality of ceramic layers 12 including a metallic element and a plurality of metal layers 14a, 14b, each of which is arranged between the ceramic layers 12. The metallic layers 14a, 14b include at least one element selected from the group consisting of Ni, Cu, Ag, and Pd in a total content of not less than 50 atm % as a main component, and at least one element selected from the metallic elements of the ceramic layers 12 in a content of not less than 1 atm % and less than 50 atm % as an additive component. This ceramic layered product can be less susceptible to fracture in the metal layers caused by firing.

22 Claims, 8 Drawing Sheets

FIG. 8A
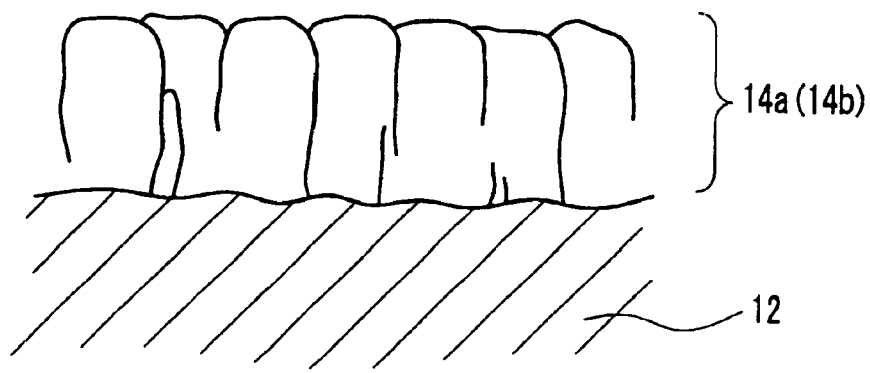
14a (14b)
12
FIG. 8B
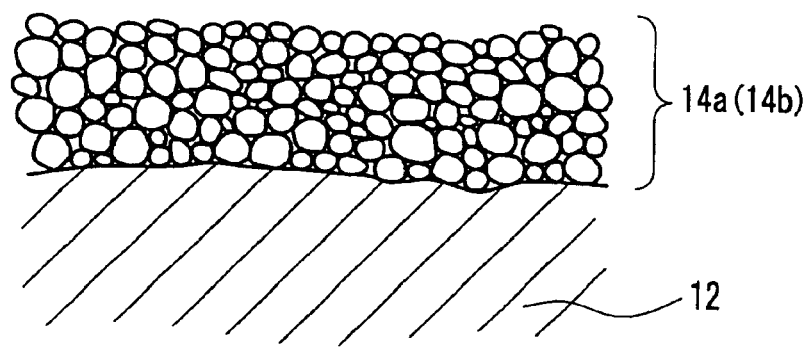
14a (14b)
12
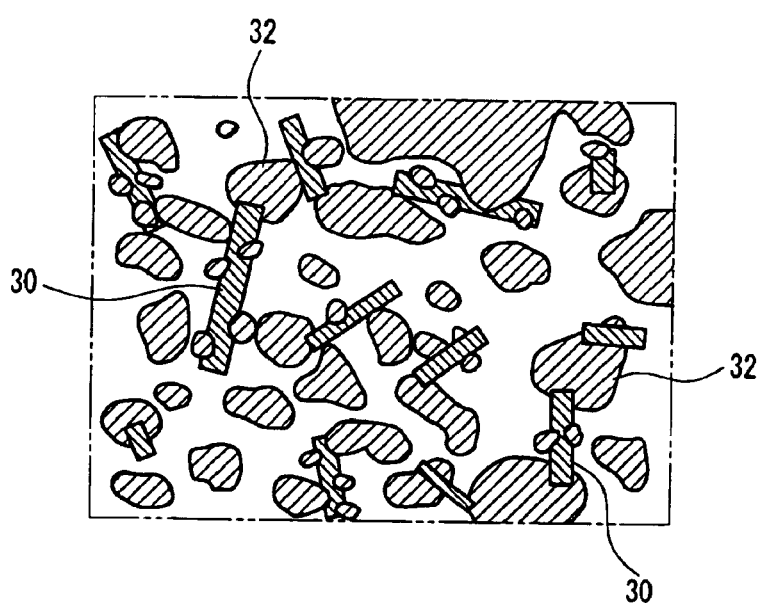
FIG. 9

CERAMIC LAYERED PRODUCT AND METHOD FOR MANUFACTURING THE SAME

BACKGROUND OF THE INVENTION

1. Field of the Invention

The present invention relates to a ceramic layered product and a method for manufacturing the ceramic layered product.

2. Description of the Related Art

A ceramic capacitor, in which ceramic layers (dielectric layers) and internal electrode layers are stacked alternately until the required number of layers is achieved, has been put into widespread practical use.

The following method is known as a method for manufacturing the ceramic capacitor. A conductive paste that serves as an internal electrode layer is printed and applied to a ceramic green sheet, and a plurality of the ceramic green sheets are stacked and fired.

Another method for forming an internal electrode layer has been developed. This method includes forming a metal thin film on a supporting film by a thin film formation method such as vapor deposition, and transferring the metal thin film onto a ceramic green sheet. Compared with the method using the conductive paste, this method significantly can reduce the thickness of the internal electrode layer, so that a small, large-capacitance ceramic capacitor is expected to be available.

Moreover, a method for improving the transfer property of a metal thin film that is formed on a supporting film with respect to a ceramic green sheet has been proposed (e.g., Japanese Patent No. 3097007).

However, when two or more layers of a ceramic green sheet provided with a metal thin film that is formed by a thin film formation method are stacked and fired, the metal thin films can be sintered and fractured. This problem becomes more pronounced as the thickness of the metal thin film is made smaller.

To achieve a small, large-capacitance ceramic capacitor, a reduction in thickness of the internal electrode layer is inevitable, and thus the internal electrode layer is required not to be fractured during firing.

SUMMARY OF THE INVENTION

Therefore, with the foregoing in mind, it is an object of the present invention to provide a ceramic layered product that includes alternately stacked ceramic and metal layers and is less susceptible to fracture in the metal layers caused by heat treatment such as firing, and a method for manufacturing the ceramic layered product.

A ceramic layered product of the present invention includes a plurality of ceramic layers including a metallic element and a plurality of metal layers, each of which is arranged between the ceramic layers. The metal layers include at least one element selected from the group consisting of Ni, Cu, Ag, and Pd in a total content of not less than 50 atm % as a main component, and at least one element selected from the metallic elements of the ceramic layers in a content of not less than 1 atm % and less than 50 atm % as an additive component.

A method for manufacturing a ceramic layered product of the present invention includes: forming a metal layer by a solventless process; and stacking a plurality of ceramic green sheets, each of which is provided with the metal layer. The ceramic green sheets include a metallic element. The metal layer includes at least one element selected from the group consisting of Ni, Cu, Ag, and Pd in a total content of not less than 50 atm % as a main component, and at least one element selected from the metallic elements of the ceramic green sheets in a content of not less than 1 atm % and less than 50 atm % as an additive component.

BRIEF DESCRIPTION OF THE DRAWINGS

FIG. 8A is a schematic diagram showing the crystal structure of an internal electrode having a columnar structure. FIG. 8B is a schematic diagram showing the crystal structure of an internal electrode having a granular structure.

FIG. 9 is a schematic diagram showing an example of the state of a metal thin film after firing a ceramic green sheet provided with a metal thin film including acicular particles in the same manner as the free surface observation in FIG. 6.

DESCRIPTION OF THE PREFERRED EMBODIMENTS

The present invention can provide a ceramic layered product that is less susceptible to fracture in the metal layers caused by heat treatment such as firing and a method for manufacturing the ceramic layered product.

Figure 1:
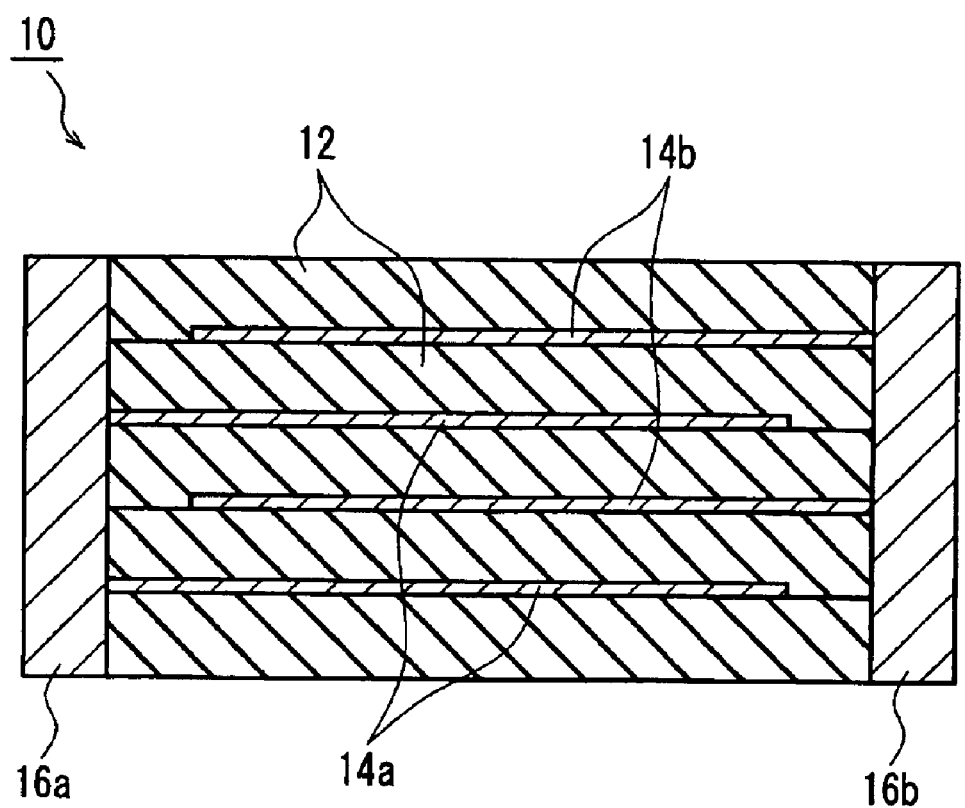
FIG. 1 is a cross-sectional view schematically showing an example of the configuration of a ceramic layered product of the present invention.

FIG. 1 is a cross-sectional view schematically showing an example of the configuration of a ceramic layered product 10 of the present invention. In FIG. 1, reference numeral 12 denotes ceramic layers, 14a and 14b denote metal layers, each of which is arranged between the ceramic layers 12, 16a and 16b denote external electrodes provided on two opposing sides of the layered product 10. The metal layers 14a, 14b are arranged alternately with the ceramic layer 12 sandwiched between them. The metal layers 14a are connected electrically to one external electrode 16a, and the metal layers 14b are connected electrically to the other external electrode 16b. Thus, this ceramic layered product 10 functions as a capacitor in which the ceramic layers 12 are used as dielectric layers, and the metal layers 14a, 14b are used as internal electrodes.

The ceramic layered product 10 of the present invention is not limited to the configuration as shown in FIG. 1. For example, the external electrodes 16a, 16b can be removed depending on its application.

The ceramic layers 12 may be produced in a conventional manner, e.g., using a ceramic green sheet that is formed of a slurry including dielectric powder of barium titanate or the like.

The metallic element included in the ceramic layers 12 is preferably Ba or Ti. These elements are included in a general dielectric powder, and therefore a ceramic layered product with desired dielectric property and temperature stability can be achieved.

The metal layers 14a, 14b include at least one element selected from the group consisting of Ni, Cu, Ag, and Pd in a total content of not less than 50 atm % as a main component, and at least one element selected from the metallic elements included by the ceramic layers 12 in a content of not less than 1 atm % and less than 50 atm % as an additive component.

The metal layers 14a, 14b include at least one element selected from the group consisting of Ni, Cu, Ag, and Pd as the main component, and the total content of the metallic elements is not less than 50 atm %. When the total content of the metallic elements is less than 50 atm %, the metal layers 14a, 14b have poor electrical conductivity. It is preferable that the metal layers 14a, 14b particularly include Ni in a content of not less than 50 atm %. Such metal layers are superior in cost, sustained stable properties, heat resistance, processability, or the like.

The metal layers 14a, 14b also include at least one element selected from the metallic elements included by the ceramic layers 12 as the additive component. This can prevent fracture in the metal layers 14a, 14b during firing. When the content of the additive component is less than 1 atm %, the effect of preventing fracture in the metal layers 14a, 14b during firing is reduced. When the content of the additive component is more than 50 atm %, the metal layers 14a, 14b have poor electrical conductivity.

It is preferable that the content of the additive component increases as it is closer to at least one surface of each of the metal layers 14a, 14b. Particularly, it is further preferable that the content of the additive component increases as it is closer to both surfaces of each of the metal layers 14a, 14b. When the metal layers 14a, 14b include a larger content of the additive component, i.e., the same metallic element as that included in the ceramic layers 12, in the vicinity of the surfaces in contact with the ceramic layers 12, the metal layers 14a, 14b can have higher resistance to fracture during firing. When the metal layers 14a, 14b include a smaller content of the additive component and a larger content of the main component in the central portion (not in contact with the ceramic layers 12) in the thickness direction, the metal layers 14a, 14b can ensure the electrical conductivity required for internal electrodes.

The thickness of the metal layers 14a, 14b is not particularly limited. The lower limit of the thickness is preferably 0.1 $\mu$m, and more preferably 0.2 $\mu$m. The upper limit of the thickness is preferably 2 $\mu$m, and more preferably 1.5 $\mu$m. When the metal layers 14a, 14b are thinner than the lower limit, they are likely to be fractured during firing and have poor electrical conductivity. When the metal layers 14a, 14b are thicker than the upper limit, they are likely to peel off the ceramic layers 12 due to the residual internal stress. Moreover, the reduction in size and the improvement in performance of the ceramic layered product 10 become difficult. Therefore, when the ceramic layered product 10 is used, e.g., as a capacitor, it is difficult to achieve a small, large-capacitance capacitor.

It is preferable that the crystal grains of the metal layers 14a, 14b form a columnar structure oriented in the thickness direction. This can further prevent fracture in the metal layers 14a, 14b during firing. As a way of forming the columnar structure, the metal layers 14a, 14b can be produced, e.g., by vapor deposition or sputtering so as to meet the above conditions of the main component and the additive component.

The grain size of the metal layers 14a, 14b is preferably not less than 0.1 $\mu$m, and more preferably not less than 0.3 $\mu$m. This can further prevent fracture in the metal layers 14a, 14b during firing. As a way of maintaining the grain size within this range, the metal layers 14a, 14b can be produced, e.g., by vapor deposition or sputtering so as to meet the above conditions of the main component and the additive component.

The packing factor of the metal layers 14a, 14b is preferably not less than 70%, and more preferably not less than 90%. This can further prevent fracture in the metal layers 14a, 14b during firing. As a way of maintaining the packing factor within this range, the metal layers 14a, 14b can be produced, e.g., by vapor deposition or sputtering so as to meet the above conditions of the main component and the additive component.

The metal layers 14a, 14b may include acicular particles. Even if the metal layers 14a, 14b are fractured by firing, the acicular particles can form a cross-link between fragments and electrically connect the fragments. Therefore, the metal layers 14a, 14b can ensure electrical conductivity.

In such a case, the acicular particles preferably include a metal that forms a hexagonal lattice. This can facilitate formation of the acicular particles.

For example, the acicular particles preferably include Ti because Ti tends to form a hexagonal lattice. Moreover, Ti is often included in the ceramic layers 12 as a component, thus reducing the harmful effect of heterogeneous elements.

It is preferable that the length of the acicular particles is longer than the thickness of the metal layers 14a, 14b. This allows the acicular particles to be present in the metal layers 14a, 14b so that the longitudinal direction of the acicular particles substantially coincides with the surface direction of the metal layers 14a, 14b. Therefore, even if the metal layers 14a, 14b are fractured by firing, it is easy for the acicular particles to electrically connect the fragments. Thus, the metal layers 14a, 14b readily can ensure electrical conductivity.

It is preferable that the length of the acicular particles in the longitudinal direction is at least two times as long as a dimension in the direction perpendicular to the longitudinal direction. Even if the metal layers 14a, 14b are fractured by firing, this makes it easy for the acicular particles to electrically connect the fragments. Thus, the metal layers 14a readily can ensure electrical conductivity.

It is preferable that the metal layers 14a, 14b further include granular particles connected to the acicular particles. Even if the metal layers 14a, 14b are fractured by firing, the acicular particles can form a cross-link between the granular particles of the fragments and electrically connect the granular particles. Therefore, the metal layers 14a, 14b can ensure electrical conductivity.

The ceramic layered product 10 as described above is manufactured by at least forming a metal layer in a solventless process and stacking a plurality of ceramic green sheets, each of which is provided with the metal layer.

The solventless process is a manufacturing method that uses no solvent. Therefore, the solventless process does not include a method in which a metal layer is formed by applying or printing conductive powder dispersed in a solvent. It is difficult to form a thin uniform metal layer with a stable property using this method. Moreover, the solventless process does not require heat treatment in an oxidizing atmosphere for decomposing the organic component of a solvent, thus simplifying the process.

Among the solventless processes, a vacuum process is preferred; resistance heating evaporation, electron beam heating evaporation, sputtering, and ion plating are more preferred; and electron beam heating evaporation and sputtering are particularly preferred. This is because a uniform metal layer with a good property can be produced stably.

The metal layer includes at least one element selected from the group consisting of Ni, Cu, Ag, and Pd in a total content of not less than 50 atm % as a main component, and at least one element selected from the metallic elements included by the ceramic green sheets in a content of not less than 1 atm % and less than 50 atm % as an additive component.

Stacking of a metal layer on a ceramic green sheet may be performed in such a manner that the metal layer is formed directly on the ceramic green sheet by the solventless process. However, it is further preferable that the metal layer is formed on a supporting film by the solventless process, and then this metal layer is transferred onto the ceramic green sheet. This makes it possible to stably produce a metal layer with fewer defects.

The solventless process for forming the metal layer is preferably multisource evaporation, multisource sputtering, or alloy sputtering. These methods easily can change the composition ratios of the main component and the additive component in the metal layer. In this case, the metal layer may be formed in an atmosphere containing oxygen.

It is preferable that the metal layer is formed so that the content of the additive component increases as it is closer to at least one surface of the metal layer. As will be described in Examples 1 and 3, when one surface of the metal layer is in contact with the ceramic green sheet and the other surface is in contact with the ceramic green sheet via an adhesive layer or the like, it is preferable that the content of the additive component is increased at least on the side of the surface directly in contact with the ceramic green sheet.

Particularly, it is further preferable that the metal layer is formed so that the content of the additive component increases as it is closer to both surfaces of the metal layer. As will be described in Example 2, when both surfaces of the metal layer are in contact with the ceramic green sheet, it is preferable that the content of the additive component is increased on the sides of the both surfaces.

When the content of the additive component is large in the vicinity of the surfaces of the metal layer, the adhesion between the metal layer and the ceramic green sheet is improved. Therefore, this can further prevent fracture in the metal layers during firing.

The above metal layer can be produced, e.g., in the following manner: a thin film formation source including the additive component and a thin film formation source including the main component are located respectively on the upstream side and the downstream side of a traveling supporting film; and a metal layer including the additive component and the main component is formed on the supporting film by multisource evaporation or multisource sputtering. This can provide a metal layer in which the content of the additive component increases as it is closer to the surface on the supporting film side and decreases as it is closer to the surface on the opposite side.

In this case, a thin film formation source including the additive component further may be located on the downstream side of the traveling supporting film from the thin film formation source including the main component. This can provide a metal layer in which the content of the additive component increases as it is closer to both surfaces and decreases in the central portion.

EXAMPLES

Hereinafter, the present invention will be described in more detail by way of specific examples.

Example 1

A ceramic layered product was manufactured in the following processes (1)–(6).

(1) Using a vacuum process, a metal thin film was formed on a supporting film, which was treated to impart releasability in accordance with an internal electrode pattern (Metal thin film formation process).

(2) A ceramic green sheet was formed on a carrier film (Ceramic green sheet formation process).

(3) An adhesive was applied to the ceramic green sheet produced in (2) in accordance with the internal electrode pattern (adhesive application process).

(4) The metal thin film formed on the supporting film produced in (1) was pressed on the ceramic green sheet produced in (3), and only a portion of the metal thin film that corresponded to the internal electrode pattern was transferred onto the ceramic green sheet (Metal thin film transfer process).

(5) The ceramic green sheet after transfer of the metal thin film produced in (4) was stacked on another ceramic green sheet by pressure bonding (Stacking process).

(6) A laminate produced in (5) was cut as needed and fired (Firing process).

Each process is described below in order.
(1) Metal thin Film Formation Process

Figure 2:
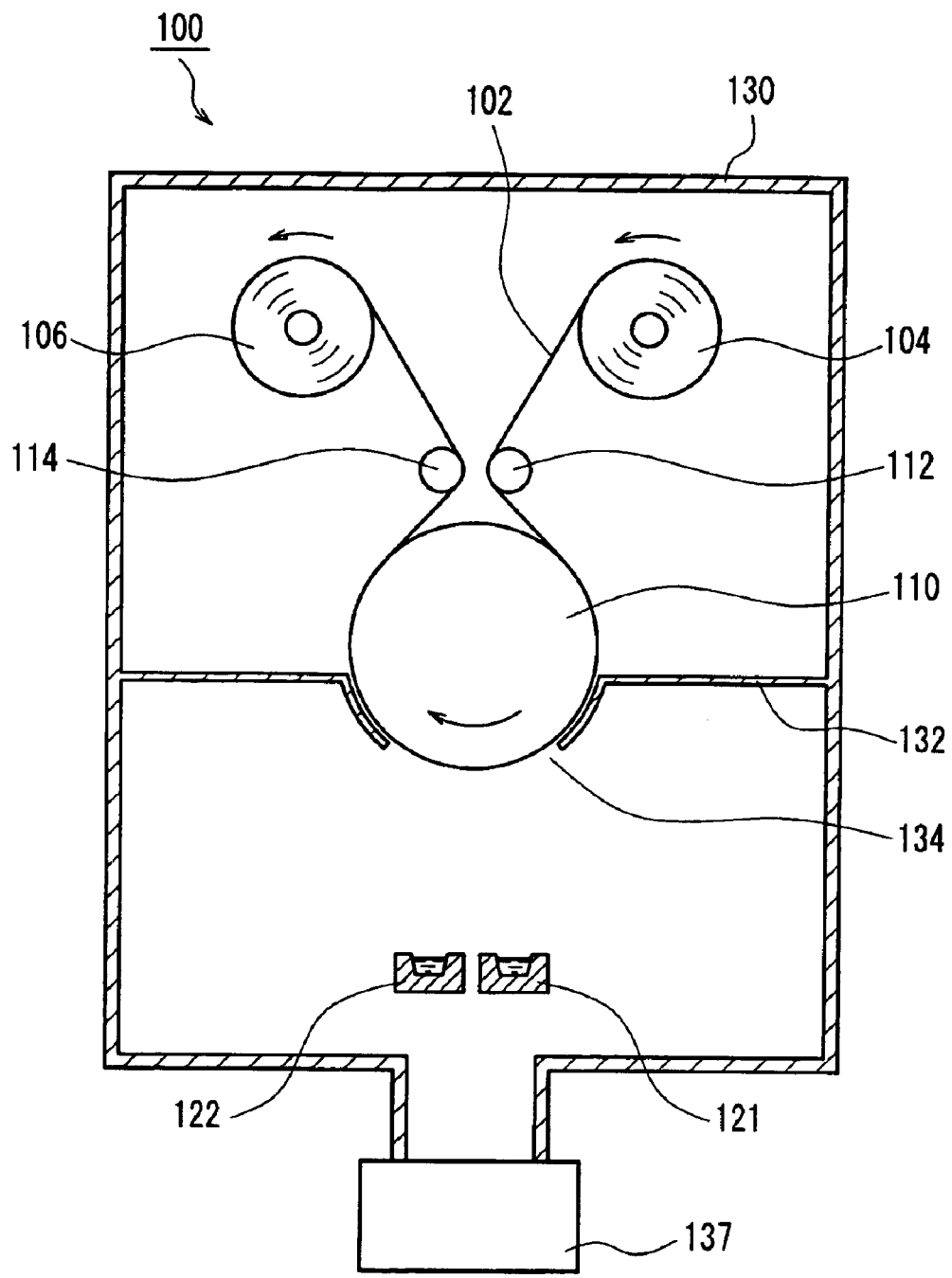
FIG. 2 is a diagram schematically showing the configuration of an apparatus for forming a metal thin film that is used in Examples of the present invention.

FIG. 2 shows an example of an apparatus for forming a metal thin film on a supporting film.

A vacuum chamber 130 is divided into upper and lower compartments by a partition 132. The upper compartment is equipped with a conveying device for a supporting film 102. The lower compartment is equipped with a thin film forming device.

The conveying device includes an unwind roll 104 from which the supporting film 102 is unwound, a wind roll 106 around which the supporting film 102 is wound, a can roller 110, and guide rolls 112, 114. The supporting film 102 is unwound from the unwind roll 104, conveyed along the guide roll 112, the can roller 110, and the guide roll 114, and wound around the wind roll 106.

The thin film forming device includes a first thin film formation source 121 and a second thin film formation source 122. They are placed under an opening 134 of the partition 132 and opposite to the supporting film 102 carried by the can roller 110. The first thin film formation source 121 and the second thin film formation source 122 are located respectively upstream and downstream along the traveling direction of the supporting film 102.

The conveying device and the thin film forming device are housed in the vacuum chamber 130, in which the degree of vacuum is maintained at a predetermined value by a vacuum pump 137 connected to the lower compartment.

The above apparatus was used to form the following three types of metal thin films on the supporting film 102.

Example 1-a (Electron Beam Evaporation with Two Sources of Ni and Ti)

As the first thin film formation source 121, Ti was put into a water-cooled copper hearth in a 270-degree deflection-type electron beam evaporation source. As the second thin film formation source 122, Ni was put into a magnesia crucible in a 270-degree deflection-type electron beam evaporation source. Ni and Ti were heated, melted, and evaporated by the irradiation of electron beams with an acceleration voltage of 10 kV, so that a metal thin film including Ni and Ti was formed on the supporting film 102 in a thickness of 0.6 μm. The electron beam source is not limited to a deflection-type electron gun as described above, and a straight-type electron gun (Pierce gun) also can be used.

The Ti evaporation source 121 and the Ni evaporation source 122 were located upstream and downstream along the traveling direction of the supporting film 102, respectively. Therefore, the Ti content of the metal thin film formed on the supporting film 102 was increased on the supporting film side, and the Ni content was increased on the opposite side. The metal thin film thus produced was evaluated by Auger electron spectroscopy while etching the surface. The results showed that the contents of Ni and Ti of the metal thin film were changed in the thickness direction as described above.

The composition ratios of Ni and Ti in the metal thin film were changed by varying an emission current of the electron beams of the evaporation sources 121, 122. The composition ratio was measured by ICP emission spectrochemical analysis.

A polyethylene terephthalate (PET) sheet was used as the supporting film 102. The surface of the supporting film 102 on which a metal thin film was to be formed was treated beforehand to impart releasability by a predetermined pattern. For this treatment, silicon resin was printed and applied to the surface. The supporting film 102 is not limited to the PET sheet, and other resin sheets also can be used. Moreover, epoxy resin may be used as a release agent.

Figure 3A:
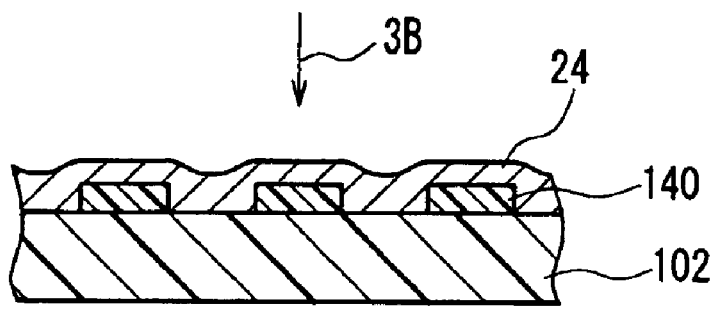
FIG. 3A is an enlarged partial cross-sectional view showing a supporting film provided with a metal thin film in Example 1 of the present invention.
Figure 3B:
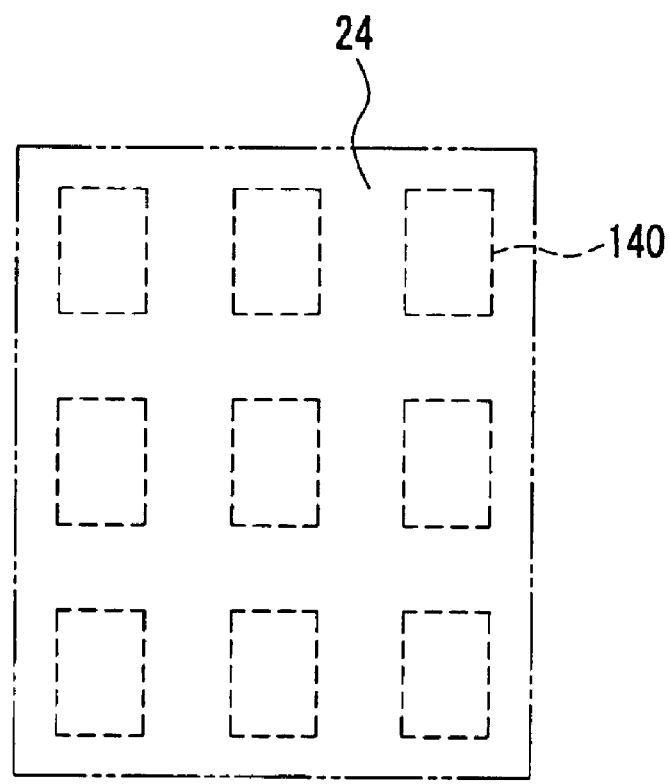
FIG. 3B is an enlarged partial plan view of this supporting film when observed from the direction of the arrow 3B in FIG. 3A.

FIG. 3A is a partially enlarged cross-sectional view showing the supporting film 102 provided with a metal thin film. FIG. 3B is a partially enlarged plan view of this supporting film 102 when observed from the direction of the arrow 3B in FIG. 3A. As illustrated in the drawings, a release layer 140 is formed on the supporting film 102 in accordance with the internal electrode pattern of a capacitor and is coated with a metal thin film 24.

Example 1-b (Alloy Sputtering Using Ni—Ba Alloy as a Target)

As the first thin film formation source 121, a RF magnetron sputtering apparatus (13.56 MHz, 2 kW) using Ni—Ba alloy as a target was used. The second thin film formation source 122 was not used. The can roller 110 was cooled so that the temperature of the supporting film 102 was 10° C. The conveying speed of the supporting film 102 was 3 nm/s. Under these conditions, a metal thin film including Ni and Ba was formed on the supporting film 102 in a thickness of 0.6 μm.

The composition ratios of Ni and Ba in the metal thin film were changed by changing the composition ratio of Ni—Ba alloy (target) so that Ba was 0, 1, 5, 10, 30, or 49 atm %. The composition ratio was measured by ICP emission spectrochemical analysis. In either case, the metal thin film had substantially the same composition ratio as that of the target.

A PET sheet, which was treated to impart releasability in the same manner as Example 1-a, was used as the supporting film 102.

Example 1-c (Sputtering with Two Sources Using Ni and Ti as Targets)

As the first thin film formation source 121, a DC sputtering apparatus using Ti as a target was used. As the second thin film formation source 122, a DC sputtering apparatus using Ni as a target was used. The can roller 110 was cooled so that the temperature of the supporting film 102 was 10° C. Under these conditions, a metal thin film including Ni and Ti was formed on the supporting film 102 in a thickness of 0.8 μm.

The Ti sputtering apparatus 121 and the Ni sputtering apparatus 122 were located upstream and downstream along the traveling direction of the supporting film 102, respectively. Therefore, the Ti content of the metal thin film formed on the supporting film 102 was increased on the supporting film side, and the Ni content was increased on the opposite side. The metal thin film thus produced was evaluated by Auger electron spectroscopy while etching the surface. The results showed that the content of Ni and Ti of the metal thin film were changed in the thickness direction as described above.

The composition ratios of Ni and Ti in the metal thin film were changed by varying power supplied to each of the sputtering apparatuses 121, 122. The composition ratio was measured by ICP emission spectrochemical analysis.

A PET sheet, which was treated to impart releasability in the same manner as Example 1-a, was used as the supporting film 102.

(2) Ceramic Green Sheet Formation Process 120 parts by weight of dielectric powder including barium titanate as the main component, 30 parts by weight of polyvinyl butyral resin, 150 parts by weight of butylcarbitol, and 4 parts by weight of dioctyl phthalate were mixed and kneaded into a ceramic dielectric slurry. The ceramic dielectric slurry was applied to a carrier film by a reverse roll method, thus forming a ceramic green sheet.

(3) Adhesive Application Process

Figure 4A:
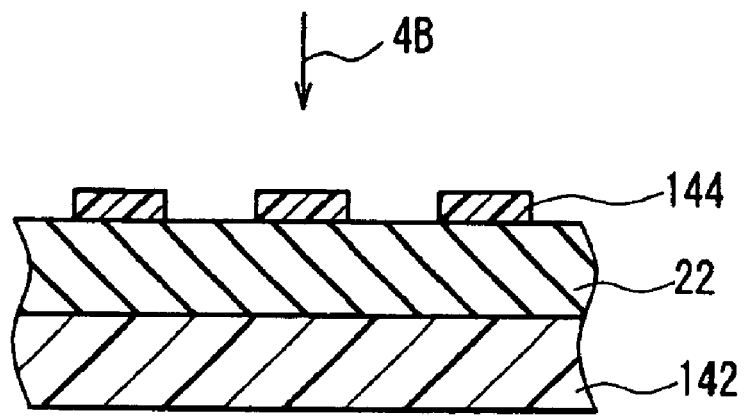
FIG. 4A is an enlarged partial cross-sectional view showing a ceramic green sheet after the application of an adhesive.
Figure 4B:
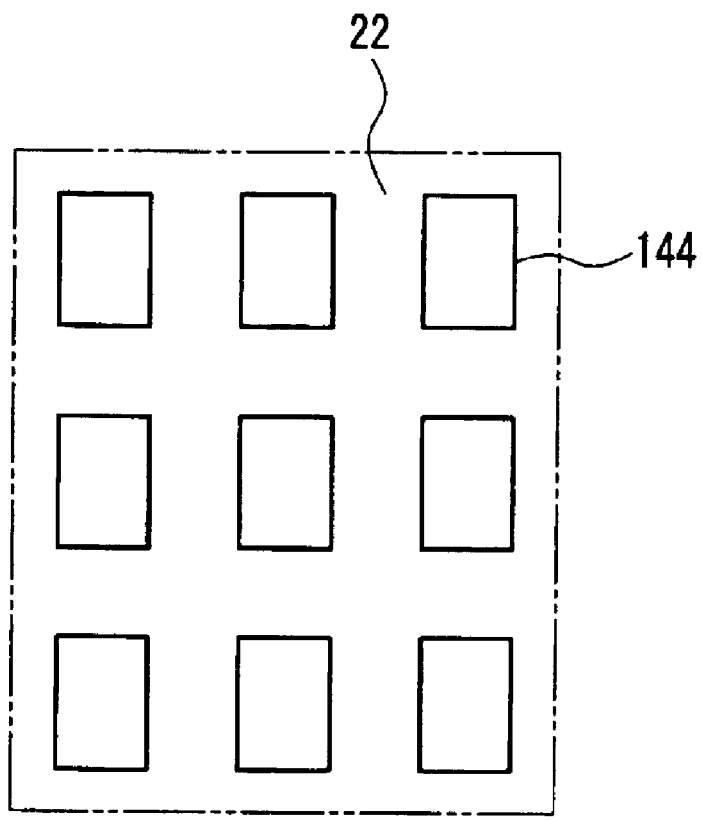
FIG. 4B is an enlarged partial plan view of this ceramic green sheet when observed from the direction of the arrow 4B in FIG. 4A.

An adhesive was applied to the ceramic green sheet produced in (2) in accordance with an internal electrode pattern by printing. A butyral resin was used as the adhesive. FIG. 4A is a partially enlarged cross-sectional view showing the ceramic green sheet after the application of an adhesive. FIG. 4B is a partially enlarged plan view of this ceramic green sheet when observed from the direction of the arrow 4B in FIG. 4A. In FIGS. 4A and 4B, reference numeral 142 denotes a carrier film, 22 denotes the ceramic green sheet, and 144 denotes an adhesive layer. The application pattern of the adhesive layer 144 is the same as the pattern of the release layer 140 in FIGS. 3A and 3B.

The adhesive is not limited to the butyral resin. For example, a phenol resin also can be used.

(4) Metal Thin Film Transfer Process

Figure 5:
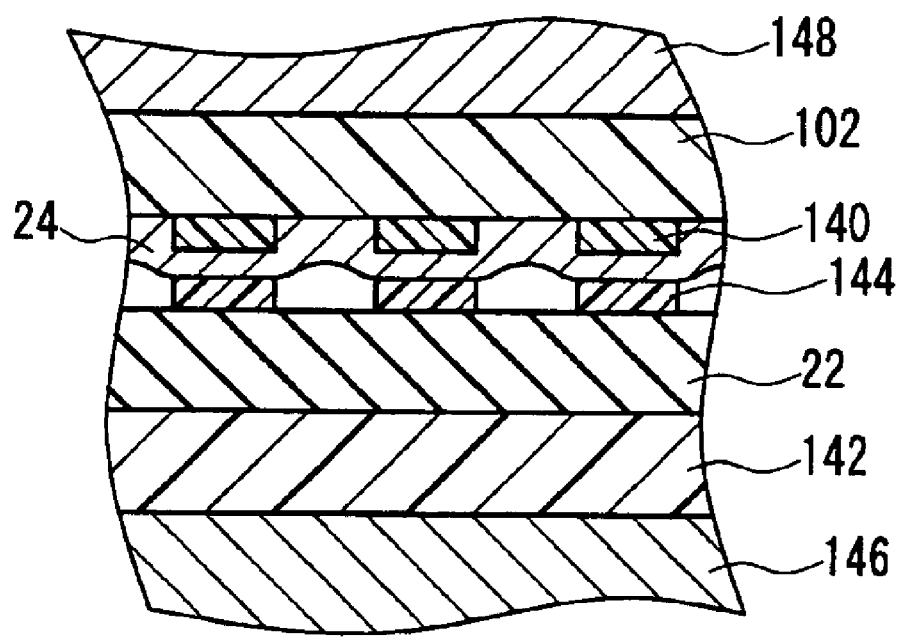
FIG. 5 is a cross-sectional side view showing a metal thin film transfer process in Example 1 of the present invention.

As shown in FIG. 5, a laminate of "carrier film 142/ceramic green sheet 22/adhesive layer 144" produced in (3) was placed on a lower pressure plate 146, on which a laminate of "supporting film 102/release layer 140/metal thin film 24" produced in (1) was placed so that the adhesive layer 144 was in contact with the metal thin film 24 and aligned with the release layer 140. On top of that, an upper pressure plate 148 was placed. Then, the lower and upper pressure plates 146, 148 were heated to 110° C. and applied a compression load of $49 \times 10^6$ Pa (500 kg/cm$^2$). The application of heat and pressure is not limited thereto, and in general can be changed appropriately in the range of $9.8 \times 10^6$ to $78.4 \times 10^6$ Pa (100 to 800 kg/cm$^2$) at 100 to 120° C.

Subsequently, the supporting film 102 was removed. In this case, the adhesive force between the adhesive layer 144 and the metal thin film 24 was larger than the adhesive force between the release layer 140 and the metal thin film 24. Therefore, only the metal thin film 24 in a region between the adhesive layer 144 and the release layer 140 was transferred onto the adhesive layer 144. The metal thin film 24 in the other region remained stuck on the supporting film 102 and was removed together with the supporting film 102.

Thus, a laminate was obtained in which the ceramic green sheet 22 was formed on the carrier film 142, and the metal thin film 24 was formed on the ceramic green sheet 22 via the adhesive layer 144.

A required number of the ceramic green sheets 22 provided with the metal thin films 24 was prepared.

(5) Stacking Process

The ceramic green sheet 22 produced in (4) was stacked on another ceramic green sheet produced in the same manner as (2) with the metal thin film side facing down, and then the carrier film 142 was removed. On top of that, the ceramic green sheet 22 produced in (4) was stacked similarly with the metal thin film side facing down until the required number of layers was achieved. In this case, the position of the metal thin film 24 was shifted to the left or right by a predetermined amount for each layer.

In Examples 1-a and 1-c, the content distribution of Ni and Ti of the metal thin film 24 in the thickness direction showed that the Ni content was increased on the side closer to the adhesive layer 144, and the Ti content was increased on the side directly in contact with the ceramic green sheet.

(6) Firing Process

The laminate produced in (5) was cut at a predetermined position in the stacking direction, and then fired at 1250°.

Subsequently, a conductive paste was applied to two opposing sides of the laminate and heated, thereby forming external electrodes connected to the metal thin films 24. Thus, a ceramic capacitor was obtained.

The firing temperature is not limited to the above, and can be set appropriately, for example in the range of 1200 to 1300° C.

Evaluation Method (a) Content of Additive Component (Element) in Metal Thin Film The content was measured by IPC emission spectrochemical analysis.

(b) Free Surface Observation

After transfer of a metal thin film onto a ceramic green sheet 22, the ceramic green sheet 22 was fired under the same conditions as the firing process without performing the stacking process. Then, the state of fracture in the metal thin film 24 was observed and rated on the following scale of A to D in view of the conductivity of the metal thin film 24. Under these conditions, the metal thin film was fired while being exposed. Therefore, this metal thin film was more likely to fracture compared with a metal thin film coated with a ceramic green sheet.

Figure 6A:
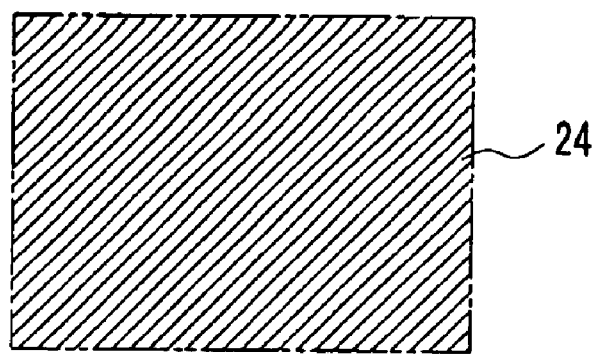
FIGS. 6A to 6D are plan views showing the conditions for free surface observation.

A: The metal thin film 24 continues without any fracture (FIG. 6A).

Figure 6B:
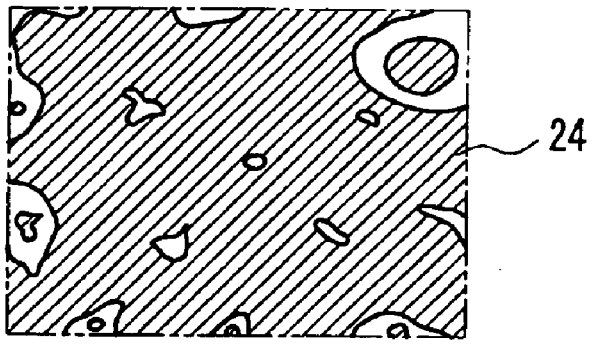

B: Although part of the metal thin film 24 is fractured, the conductivity is considered to be ensured across almost the entire surface (FIG. 6B).

Figure 6C:
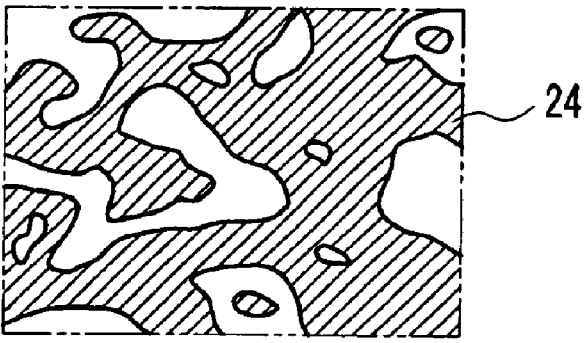

C: Although the metal thin film 24 is fractured considerably, the conductivity between the fragments is considered to be almost ensured (FIG. 6C).

Figure 6D:
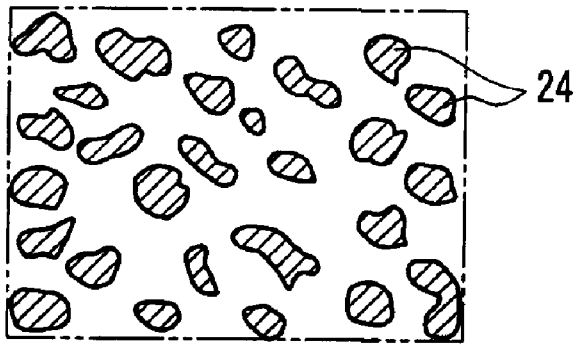

D: The metal thin film 24 is fractured completely, and the individual fragments are considered to be almost insulated electrically from one another (FIG. 6D).

FIGS. 6A to 6D simply show an example. When the metal thin film 24 includes acicular particles, the state of fracture as shown in FIG. 9 may occur. In this case, the state of fracture may be rated on the above scale of A to D, taking into account whether or not the acicular particles form a cross-link between the fragments and electrically connect them.

(c) Layered Cross Section Observation

The resultant ceramic capacitor was cut in its thickness direction, and the state of the internal electrodes 14a, 14b (the metal thin films 24) at the cutting plane was observed and rated on the following scale of A to C.

Figure 7A:
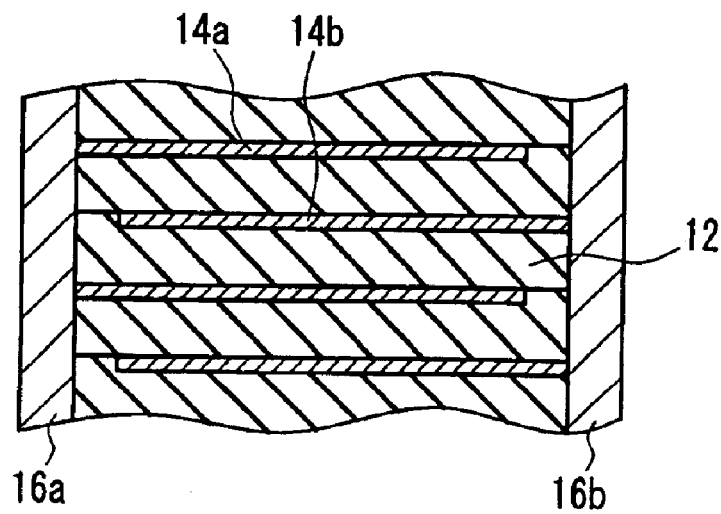
FIGS. 7A to 7C are cross-sectional views showing the conditions for layered cross section observation.

A: The internal electrodes 14a, 14b continue without any fracture (FIG. 7A).

Figure 7B:
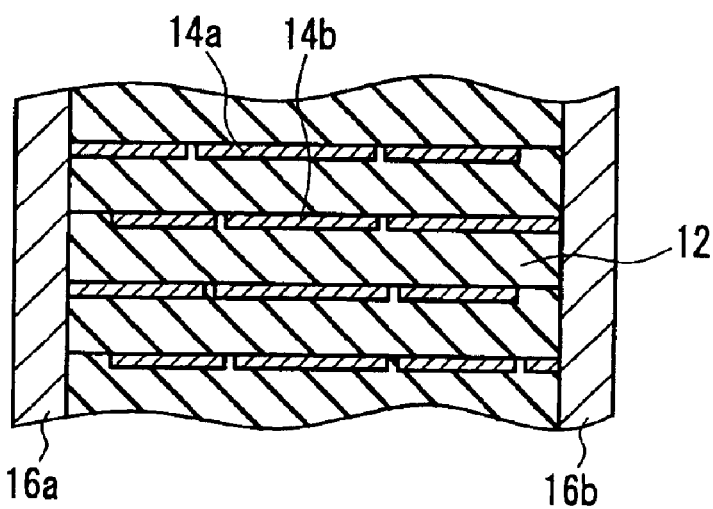
Figure 7C:
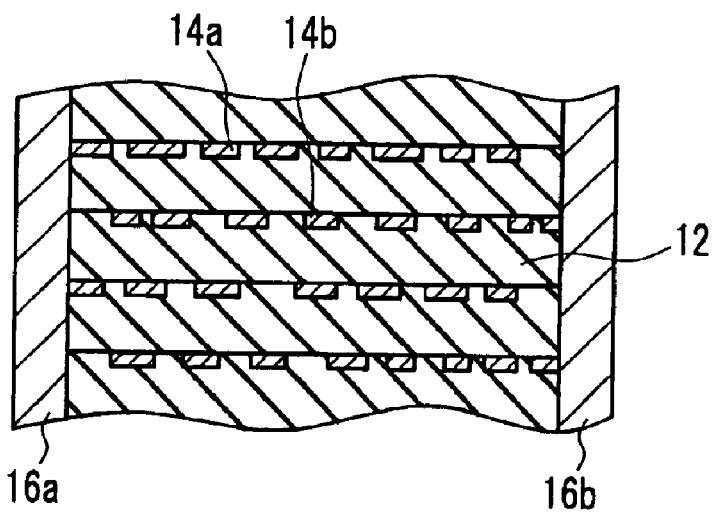

B: Part of the internal electrodes 14a, 14b is fractured (FIG. 7B).

C: The internal electrodes 14a, 14b are fractured considerably (FIG: 7C).

(d) Capacitance Achievement

The capacitance value of the resultant ceramic capacitor was measured to determine a ratio of the capacitance value to the design capacitance value. When the internal electrodes were fractured, the measured capacitance value was reduced, and the capacitance achievement was lowered.

(e) Fine Structure

The resultant ceramic capacitor was cut in its thickness direction, and the cutting plane of the internal electrodes was observed by a scanning electron microscope (SEM). When the crystals grow largely so that the longitudinal direction coincides with the stacking direction as shown in FIG. 8A, this crystal structure is referred to as "columnar structure". When the crystals are fine-grained as shown in FIG. 8B, this crystal structure is referred to as "granular structure". When it is difficult to distinguish between the columnar structure and the granular structure, such a structure is referred to as "columnar-granular".

(f) Grain Size

The resultant ceramic capacitor was cut in its thickness direction, and the cutting plane of the internal electrodes was observed by a scanning electron microscope (SEM). The average particle diameter of metallic crystals in the stacking direction is defined as a grain size.

(g) Packing Factor

The thickness of the metal thin film on the supporting film produced in the metal thin film formation process was measured by a scanning electron microscope (SEM). This metal thin film was cut into a predetermined size, and the mass was measured with chemical quantification. According to these measurements, the packing factor of the metal thin film was determined by calculation.

Evaluation Results

Examples 1-a, 1-b, and 1-c were evaluated for each of the above items while changing the composition ratio of the metal thin film. Tables 1, 2, and 3 show the results.

TABLE 1

Example 1-a (Electron beam evaporation with two sources of Ni and Ti)

| Content of additive component (Ti) [atm %] | Free surface observation | Layered cross section observation | Capacitance achievement [%] | Fine structure | Grain size [μm] | Packing factor [%] |
|---|---|---|---|---|---|---|
| 0 | D | C | 5 | granular | 0.03 | 40 |
| 1 | B | B | 70 | columnar-granular | 0.08 | 60 |
| 6 | B | B | 90 | columnar | 0.2 | 80 |
| 20 | A | A | 100 | columnar | 0.4 | 90 |
| 34 | A | A | 100 | columnar | 0.6 | 95 |
| 49 | A | A | 100 | columnar | 0.6 | 95 |

TABLE 2

Example 1-b (Alloy sputtering using Ni—Ba alloy as a target)

| Content of additive component (Ba) [atm %] | Free surface observation | Layered cross section observation | Capacitance achievement [%] | Fine structure | Grain size [μm] | Packing factor [%] |
|---|---|---|---|---|---|---|
| 0 | D | C | 5 | granular | 0.04 | 40 |
| 1 | B | B | 70 | columnar-granular | 0.06 | 60 |
| 5 | B | B | 85 | columnar | 0.2 | 75 |
| 10 | A | A | 100 | columnar | 0.4 | 90 |
| 30 | A | A | 100 | columnar | 0.6 | 95 |
| 49 | A | A | 100 | columnar | 0.6 | 100 |

TABLE 3

Example 1-c (Sputtering with two sources using Ni and Ti as targets)

| Content of additive component (Ti) [atm %] | Free surface observation | Layered cross section observation | Capacitance achievement [%] | Fine structure | Grain size [μm] | Packing factor [%] |
|---|---|---|---|---|---|---|
| 0 | C | B | 40 | granular | 0.04 | 45 |
| 1 | A | A | 100 | columnar-granular | 0.1 | 65 |
| 8 | A | A | 100 | columnar | 0.4 | 80 |
| 29 | A | A | 100 | columnar | 0.6 | 95 |
| 49 | A | A | 100 | columnar | 0.6 | 90 |

As can be seen from Tables 1 to 3, when the metal thin film included Ti or Ba, which was also included in the ceramic layer, in a content of not less than 1 atm % and less than 50 atm %, the metal thin film was hardly fractured in the firing process of the ceramic green sheet. Thus, a capacitor having a capacitance near the design value was obtained.

Example 2

A ceramic layered product was manufactured in the following processes (1)–(5).

(1) Using a vacuum process, a metal thin film was formed on a supporting film, which was treated to impart releasability in accordance with an internal electrode pattern (Metal thin film formation process).

(2) A ceramic green sheet was formed on a carrier film (Ceramic green sheet formation process).

(3) The metal thin film formed on the supporting film produced in (1) was pressed on the ceramic green sheet produced in (2), and only a portion of the metal thin film that corresponded to the internal electrode pattern was transferred onto the ceramic green sheet (Metal thin film transfer process).

(4) The ceramic green sheet after transfer of the metal thin film produced in (3) was stacked on another ceramic green sheet by pressure bonding (Stacking process).

(5) A laminate produced in (4) was cut as needed and fired (Firing process).

The manufacturing processes of a ceramic layered product in Example 2 were the same as Example 1 except that the adhesive application process was omitted.

Each process is described below in order.

(1) Metal Thin Film Formation Process

The apparatus shown in FIG. 2 was used to form a metal thin film on a supporting film 102 in the same manner as Example 1.

Example 2-a (Electron Beam Evaporation with Two Sources of Ni and Ti)

A metal thin film including Ni and Ti was formed on the supporting film 102 in the same manner as Example 1-a except that the thickness of the metal thin film was 0.4 μm.

Example 2-b (Alloy Sputtering Using Ni—Ba Alloy as a Target)

A metal thin film including Ni and Ba was formed on the supporting film 102 in the same manner as Example 1-b except that the thickness of the metal thin film was 0.4 μm.

(2) Ceramic Green Sheet Formation Process

The same ceramic dielectric slurry as Example 1 was applied to a carrier film 142 by a reverse roll method, thus forming a ceramic green sheet 22.

(3) Metal Thin Film Transfer Process

As with Example 1, a laminate of "supporting film 102/release layer 140/metal thin film 24" produced in (1) was placed on a laminate of "carrier film 142/ceramic green sheet 22" produced in (2) so that the ceramic green sheet 22 was in contact with the metal thin film 24. Then, a lower pressure plate 146 and an upper pressure plate 148 were heated to 110° C. and applied a compression load of 49×10$^6$ Pa (500 kg/cm$^2$).

Subsequently, the supporting film 102 was removed. Unlike Example 1, an adhesive layer was not applied to the ceramic green sheet 22 in Example 2. However, the adhesive force between the ceramic green sheet 22 and the metal thin film 24 was larger than the adhesive force between the release layer 140 and the metal thin film 24. Therefore, only the metal thin film 24 formed on the release layer 140 was transferred onto the ceramic green sheet 22. The metal thin film 24 in the other region remained stuck on the supporting film 102 and was removed together with the supporting film 102.

Thus, a laminate was obtained in which the ceramic green sheet 22 was formed on the carrier film 142, and the metal thin film 24 was formed on the ceramic green sheet 22 in accordance with the internal electrode pattern.

A required number of the ceramic green sheets 22 provided with the metal thin films 24 was prepared.

(4) Stacking Process

As with Example 1, the ceramic green sheet 22 produced in (3) was stacked on another ceramic green sheet produced in the same manner as (2) until the required number of layers was achieved.

(5) Firing Process

As with Example 1, the laminate produced in (4) was cut and fired, and then external electrodes were formed. Thus, a ceramic capacitor was obtained.

Evaluation Results

Examples 2-a and 2-b were evaluated for the same items as Example 1 while changing the composition ratio of the metal thin film. Tables 4 and 5 show the results.

TABLE 4

Example 2-a (Electron beam evaporation with two sources of Ni and Ti)

| Content of additive component (Ti) [atm %] | Free surface observation | Layered cross section observation | Capacitance achievement [%] | Fine structure | Grain size [μm] | Packing factor [%] |
|---|---|---|---|---|---|---|
| 0 | D | C | 1 | granular | 0.03 | 35 |
| 1 | C | B | 65 | columnar-granular | 0.08 | 60 |
| 6 | B | B | 70 | columnar | 0.15 | 70 |
| 20 | B | A | 90 | columnar | 0.35 | 90 |
| 34 | A | A | 100 | columnar | 0.40 | 95 |
| 49 | A | A | 100 | columnar | 0.40 | 90 |

TABLE 5

Example 2-b (Alloy sputtering using Ni—Ba alloy as a target)

| Content of additive component (Ba) [atm %] | Free surface observation | Layered cross section observation | Capacitance achievement [%] | Fine structure | Grain size [μm] | Packing factor [%] |
|---|---|---|---|---|---|---|
| 0 | D | C | 1 | granular | 0.04 | 40 |
| 1 | C | B | 60 | columnar-granular | 0.07 | 55 |
| 5 | B | B | 65 | columnar | 0.10 | 65 |
| 10 | B | B | 85 | columnar | 0.36 | 80 |
| 30 | A | A | 100 | columnar | 0.40 | 95 |
| 49 | A | A | 100 | columnar | 0.40 | 90 |

As can be seen from Tables 4 and 5, when the metal thin film included Ti or Ba, which was also included in the ceramic layer, in a content of not less than 1 atm % and less than 50 atm %, the metal thin film was hardly fractured in the firing process of the ceramic green sheet. Thus, a capacitor having a capacitance near the design value was obtained.

Example 3

A ceramic layered product was manufactured in the following processes (1)–(6).

(1) Using a vacuum process, a metal thin film was formed on a supporting film (Metal thin film formation process).

(2) A ceramic green sheet was formed on a carrier film (Ceramic green sheet formation process).

(3) An adhesive was applied to the ceramic green sheet produced in (2) in accordance with an internal electrode pattern (Adhesive application process).

(4) The metal thin film formed on the supporting film produced in (1) was pressed on the ceramic green sheet produced in (3), and only a portion of the metal thin film that corresponded to the internal electrode pattern was transferred onto the ceramic green sheet (Metal thin film transfer process).

(5) The ceramic green sheet after transfer of the metal thin film produced in (4) was stacked on another ceramic green sheet by pressure bonding (Stacking process).

(6) A laminate produced in (5) was cut as needed and fired (Firing process).

The manufacturing processes of a ceramic layered product in Example 3 were the same as Example 1 except that the supporting film was not treated to impart releasability.

Each process is described below in order.

(1) Metal Thin Film Formation Process

The apparatus shown in FIG. 2 was used to form a metal thin film on a supporting film 102 in the same manner as Example 1 except that a PET sheet, which was not treated to impart releasability, was used as the supporting film 102.

Example 3-a (Sputtering with Two Sources Using Ni and Ti as Targets)

A metal thin film including Ni and Ti was formed on the supporting film 102 in the same manner as Example 1-c except that the thickness of the metal thin film was 0.3 μm.

(2) Ceramic Green Sheet Formation Process

The same ceramic dielectric slurry as Example 1 was applied to a carrier film 142 by a reverse roll method, thus forming a ceramic green sheet 22.

(3) Adhesive Application Process

As with Example 1, an adhesive was applied to the ceramic green sheet 22 produced in (2) in accordance with an internal electrode pattern by printing.

(4) Metal Thin Film Transfer Process

As with Example 1, a laminate of "supporting film 102/metal thin film 24" produced in (1) was placed on a laminate of "carrier film 142/ceramic green sheet 22/adhesive layer 144" produced in (3) so that the adhesive layer 144 was in contact with the metal thin film 24. Then, a lower pressure plate 146 and an upper pressure plate 148 were heated to 110° C. and applied a compression load of $49 \times 10^6$ Pa (500 kg/cm$^2$).

Subsequently, the supporting film 102 was removed. Unlike Example 1, a release layer was not applied to the supporting film 102 in Example 3. However, the adhesive force between the adhesive layer 144 and the metal thin film 24 was larger than the adhesive force between the supporting film 102 and the metal thin film 24. Therefore, only the metal thin film 24 in a region in contact with the adhesive layer 144 was transferred onto the adhesive layer 144. The metal thin film 24 in the other region remained stuck on the supporting film 102 and was removed together with the supporting film 102.

Thus, a laminate was obtained in which the ceramic green sheet 22 was formed on the carrier film 142, and the metal thin film 24 was formed on the ceramic green sheet 22 via the adhesive layer 144.

A required number of ceramic green sheets 22 provided with the metal thin films 24 was prepared.

(5) Stacking Process

As with Example 1, the ceramic green sheet 22 produced in (4) was stacked on another ceramic green sheet produced in the same manner as (2) until the required number of layers was achieved.

As with Examples 1-a and 1-b, the content distribution of Ni and Ti of the metal thin film 24 in the thickness direction showed that Ni content was increased on the side closer to the adhesive layer 144, and Ti content was increased on the side directly in contract with the ceramic green sheet.

(6) Firing Process

As with Example 1, the laminate produced in (5) was cut and fired, and then external electrodes were formed. Thus, a ceramic capacitor was obtained.

Evaluation Results

Example 3-a was evaluated for the same items as Example 1 while changing the composition ratio of the metal thin film. Table 6 shows the results.

TABLE 6

Example 3-a (Sputtering with two sources using Ni and Ti as targets)

| Content of additive component (Ti) [atm %] | Free surface observation | Layered cross section observation | Capacitance achievement [%] | Fine structure | Grain size [μm] | Packing factor [%] |
|---|---|---|---|---|---|---|
| 0 | C | C | 1 | granular | 0.04 | 40 |
| 1 | B | B | 50 | columnar-granular | 0.08 | 55 |

TABLE 6-continued

Example 3-a (Sputtering with two sources using Ni and Ti as targets)

| Content of additive component (Ti) [atm %] | Free surface observation | Layered cross section observation | Capacitance achievement [%] | Fine structure | Grain size [μm] | Packing factor [%] |
|---|---|---|---|---|---|---|
| 8 | B | B | 70 | columnar | 0.30 | 70 |
| 29 | A | A | 100 | columnar | 0.30 | 85 |
| 49 | A | A | 100 | columnar | 0.30 | 90 |

As can be seen form Table 6, when the metal thin film included Ti, which was also included in the ceramic layer, in a content of not less than 1 atm % and less than 50 atm %, the metal thin film was hardly fractured in the firing process of the ceramic green sheet. Thus, a capacitor having a capacitance near the design value was obtained.

In Examples 1-a, 1-c, 2-a, and 3-a, the first thin film formation source 121 and the second thin film formation source 122 were arranged along the traveling direction of the supporting film 102. Therefore, a metal thin film had different contents of material in the thickness direction, i.e., the content of material produced by the second thin film formation source was large on one surface side, and the content of material produced by the first thin film formation source was large on the other surface side. However, the present invention is not limited thereto. For example, the first thin film formation source 121, the second thin film formation source 122, and the first thin film formation source 121 may be arranged in this order along the traveling direction of the supporting film 102. This also can provide a metal thin film with different contents of material in the thickness direction, i.e., the content of material produced by the first thin film formation sources is large in the vicinity of both surfaces, and the content of material produced by the second thin film formation source is large in the central portion. This configuration is effective particularly for Example 2-a, where both surfaces of the metal thin film are in contact with the ceramic green sheets, and no adhesive layer is placed therebetween.

When the elements added to the metal thin film are selected appropriately, the metal thin film can have a structure that includes acicular particles 30 after firing, as shown in FIG. 9. Even if the metal layer is fractured by firing, the acicular particles 30 can form a cross-link between fragments 32 and electrically connect the fragments 32. Therefore, a rise in electrical resistance of the metal thin film can be reduced. The acicular particles 30 are likely to be generated when they include a metal that forms a hexagonal lattice. For example, the presence of acicular particles was confirmed after the metal thin film including, e.g., Ti was fired. When the metal thin film is fractured by firing, the fragments 32 other than the acicular particles 30 are often granular sintered particles having a circular or elliptical projection shape. To form a cross-link between the individual fragments 32 and electrically connect them, the acicular particles 30 preferably have a length longer than the thickness of the metal thin film. This allows the acicular particles 30 to be present in the metal thin film so that the longitudinal direction of the acicular particles 30 is parallel or oblique to the plane including the metal thin film.

Therefore, the acicular particles 30 easily can form a cross-link between the fragments 32. Moreover, the acicular particles 30 preferably have such a shape that a ratio (acicular ratio) of a length in the longitudinal direction to a dimension in the direction perpendicular to the longitudinal direction is large, i.e., a narrow shape. Specifically, this ratio is preferably not less than 2, and more preferably not less than 3. This is because the acicular particles 30 easily can exhibit the effect of forming a cross-link between the fragments 32. It is not necessary for the metal thin film to include only the acicular particles 30. When the metal thin film includes at least the acicular particles 30, the acicular particles 30 and the granular fragments 32 around them are connected mutually. Therefore, it is possible to prevent a rise in electrical resistance of the metal thin film caused by fracture during firing.

An example of the application of a ceramic layered product to a capacitor is mainly described above. However, a ceramic layered product of the present invention is not limited to the capacitor, and also can be used in other applications, such as a wiring board that is produced by forming a circuit on a ceramic insulating layer with a metal layer and a coil. In this case, the same effects as described above also can be obtained.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A ceramic layered product comprising:
    a plurality of ceramic layers including a metallic element; and
    a plurality of metal layers, each of which is arranged between the ceramic layers,
    wherein the metal layers include at least one element selected from the group consisting of Ni, Cu, Ag, and Pd in a total content of not less than 50 atm % as a main component, and at least one element selected from the metallic elements of the ceramic layers in a content of not less than 1 atm % and less than 50 atm % as an additive component, and
    crystal grains of the metal layers form a columnar structure oriented in a thickness direction.

2. The ceramic layered product according to claim 1, wherein each of the metal layers includes Ni in a content of not len than 50 atm %.

3. The ceramic layered product according to claim 1, wherein the metallic element included in the ceramic layers is Ba or Ti.

4. The ceramic layered product according to claim 1, wherein a content of the additive component increases as it is closer to at least one surface of each of the metal layers.

5. The ceramic layered product according to claim 1, wherein a content of the additive component increases as it is closer to both surfaces of each of the metal layers.

6. The ceramic layered product according to claim 1, wherein the metal layers have a thickness of 0.1 μm to 2 μm.

7. The ceramic layered product according to claim 1, wherein a grain size of the metal layers is not less than 0.1 μm.

8. The ceramic layered product according to claim 1, wherein a packing factor of the metal layers is not less than 70%.

9. The ceramic layered product according to claim 1, wherein the metal layers further comprise acicular particles.

10. The ceramic layered product according to claim 9, wherein the acicular particles include a metal that forms a hexagonal lattice.

11. The ceramic layered product according to claim 9, wherein the acicular particles include Ti.

12. The ceramic layered product according to claim 9, wherein a length of the acicular particles is longer than a thickness of the metal layers.

13. The ceramic layered product according to claim 9, wherein a length of the acicular particles in a longitudinal direction is at least two times as long as a dimension in a direction perpendicular to the longitudinal direction.

14. The ceramic layered product according to claim 9, wherein the metal layers further include granular particles connected to the acicular particles.

15. A method for manufacturing a ceramic layered product comprising:

forming a metal layer by a solventless process; and stacking a plurality of ceramic green sheets, each of which is provided with the metal layer, wherein the ceramic green sheets include a metallic element, the metal layer includes at least one element selected from the group consisting of Ni, Cu, Ag, and Pd in a total content of not less than 50 atm % as a main component, and at least one element selected from the metallic elements of the ceramic green sheets in a content of not less than 1 atm % and less than 50 atm % as an additive component, and crystal grains of the metal layers form a columnar structure oriented in a thickness direction.

16. The method according to claim 15, further comprising:

transferring the metal layer formed on a supporting film onto a ceramic green sheet so that the ceramic green sheet is provided with the metal layer.

17. The method according to claim 15, wherein the solventless process is multisource evaporation, multisource sputtering, or alloy sputtering.

18. The method according to claim 17, wherein the metal layer is formed in an atmosphere containing oxygen.

19. The method according to claim 15, wherein the metal layer is farmed so that a content of the additive component increases as it is closer to at least one surface of the metal layer.

20. The method according to claim 15, wherein the metal layer is formed so that a content of the additive component increases as it is closer to both surfaces of the metal layer.

21. The method according to claim 15, wherein a thin film formation source including the additive component and a thin film formation source including the main component are located respectively on an upstream side and a downstream side of a traveling supporting film, and a metal layer including the additive component and the main component is formed on the supporting film by multisource evaporation or multisource sputtering.

22. The method according to claim 21, wherein a thin film formation source including the additive component farther is located on a downstream side of the traveling supporting film from the thin film formation source including the main component.

* * * * *

UNITED STATES PATENT AND TRADEMARK OFFICE
CERTIFICATE OF CORRECTION

PATENT NO.   : 6,954,350 B2
DATED        : October 11, 2005
INVENTOR(S)  : Honda et al.

It is certified that error appears in the above-identified patent and that said Letters Patent is hereby corrected as shown below:

Column 10,
Line 67, "not len than" should read -- not less than --.

Column 20,
Line 21, "layer is farmed so that" should read -- layer is formed so that --.
Line 40, "component farther is" should read -- component further is --.

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,954,350 B2 | Page 1 of 1 |
| APPLICATION NO. | : 10/663629 | |
| DATED | : October 11, 2005 | |
| INVENTOR(S) | : Honda et al. | |

It is certified that error appears in the above-identified patent and that said Letters Patent is hereby corrected as shown below:

Col. 18, line 67: "not len than" should read --not less than--

Signed and Sealed this

Seventh Day of November, 2006

JON W. DUDAS
*Director of the United States Patent and Trademark Office*